(12) United States Patent
Gutgesell et al.

(10) Patent No.: US 12,467,305 B2
(45) Date of Patent: Nov. 11, 2025

(54) DRIVE FOR ADJUSTING AN ADJUSTMENT ELEMENT OF A MOTOR VEHICLE

(71) Applicant: Brose Fahrzeugteile SE & Co. Kommanditgesellschaft, Bamberg, Bamberg (DE)

(72) Inventors: Andreas Gutgesell, Bamberg (DE); Matthias Fischer, Itzgrund (DE); Mattias Seidl, Küps (DE); Peter Pfrenger, Eisfeld (DE); Michael Schneiderbanger, Rattelsdorf (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 438 days.

(21) Appl. No.: 17/924,750

(22) PCT Filed: May 11, 2021

(86) PCT No.: PCT/EP2021/062537
§ 371 (c)(1),
(2) Date: Nov. 11, 2022

(87) PCT Pub. No.: WO2021/228893
PCT Pub. Date: Nov. 18, 2021

(65) Prior Publication Data
US 2023/0184018 A1 Jun. 15, 2023

(30) Foreign Application Priority Data
May 13, 2020 (DE) ............. 10 2020 112 977.7

(51) Int. Cl.
*E05F 15/53* (2015.01)
*E05F 15/622* (2015.01)

(52) U.S. Cl.
CPC ............ *E05F 15/53* (2015.01); *E05F 15/622* (2015.01); *E05Y 2201/454* (2013.01);
(Continued)

(58) Field of Classification Search
None
See application file for complete search history.

(56) References Cited

U.S. PATENT DOCUMENTS

| 9,360,077 B2 | 6/2016 | Bochen et al. |
| 2015/0040702 A1 | 2/2015 | Bochen et al. |

(Continued)

FOREIGN PATENT DOCUMENTS

| CN | 110050104 A | 7/2019 | |
| DE | 10046961 A1 * | 4/2001 | ............ F16F 9/0245 |

(Continued)

OTHER PUBLICATIONS

DE-10046961-A1: English machine translation (Year: 2001).*
(Continued)

*Primary Examiner* — Melanie Torres Williams
(74) *Attorney, Agent, or Firm* — Dickinson Wright PLLC (57) ABSTRACT

A drive for adjusting an adjustment element of a motor vehicle, the drive including a hollow cylinder, a rod guided axially therein, two articulated parts configured to provide linear drive movements to the motor vehicle and form a drive connection to the adjustment element and the rest of the motor vehicle. The one articulated part axially fixed to a first component of the components of the drive unit and the other articulated part axially fixed to a second component of the components of the drive unit in the installed state. The drive has a drive spring assembly including a drive spring acting on the articulated parts. In the installed state, at least one of the components of the drive unit is axially fixed to a securing element by a threaded connection, and the securing (Continued)

element projects radially into an axial projection of a spring material of the drive spring assembly.

18 Claims, 5 Drawing Sheets

(52) U.S. Cl.
CPC ... *E05Y 2201/456* (2013.01); *E05Y 2201/478* (2013.01); *E05Y 2600/56* (2013.01); *E05Y 2800/428* (2013.01); *E05Y 2800/676* (2013.01); *E05Y 2900/546* (2013.01)

(56) References Cited

U.S. PATENT DOCUMENTS

| | | |
|---|---|---|
| 2019/0284862 A1 | 9/2019 | Buchheim et al. |
| 2021/0164282 A1 | 6/2021 | Fischer |

FOREIGN PATENT DOCUMENTS

| | | | |
|---|---|---|---|
| DE | 102012201174 A1 | 8/2013 | |
| DE | 102014201941 A1 | 8/2015 | |
| DE | 102014105956 A1 | 10/2015 | |
| DE | 102014109460 A1 | 1/2016 | |
| DE | 102016214837 A1 | 2/2017 | |
| DE | 112015005249 T5 * | 8/2017 | ............ E05F 15/611 |
| DE | 102018002905 A1 | 10/2019 | |
| DE | 102018115774 A1 | 1/2020 | |
| DE | 102018117889 A1 | 1/2020 | |
| FR | 2941508 A1 * | 7/2010 | ............ E05F 15/622 |
| WO | WO-2020058128 A1 * | 3/2020 | ............ E05F 1/1058 |

OTHER PUBLICATIONS

FR-2941508-A1: English machine translation (Year: 2010).*
WO-2020058128-A1: English machine translation (Year: 2020).*
DE-112015005249-T5: English machine translation (Year: 2017).*
Chinese Office Action for Chinese Application No. CN 202180034612.0, Dated Dec. 26, 2024, English Translation attached to original document, All together 18 Pages.

\* cited by examiner

DRIVE FOR ADJUSTING AN ADJUSTMENT ELEMENT OF A MOTOR VEHICLE

CROSS-REFERENCE TO RELATED APPLICATIONS

This application is the U.S. National Phase of PCT Application No. PCT/EP2021/062537 filed on May 11, 2021, which claims priority to German Patent Application No. DE 10 2020 112 977.7, filed on May 13, 2020, the disclosures of which are hereby incorporated in their entirety by reference herein.

TECHNICAL FIELD

The present disclosure relates to a drive for adjusting an adjustment element, such as a flap, of a motor vehicle.

BACKGROUND

Vehicles may include a spindle drive configured for use in all types of adjustment or closure elements of a motor vehicle. The term "adjustment element" should be understood here as wide-ranging. It comprises, for example, flaps, such as tailgates, trunk lids, front hoods, side doors, luggage compartment flaps or the like, or sliding doors of a motor vehicle.

In order to adjust such an adjustment element, for example a tailgate, different types of drive are known. Thus, motor-driven and also motor-free and in particular spring-driven drives are known. A motor-driven drive is, for example, a spindle drive which uses a drive motor to drive a spindle/spindle nut mechanism as an advancing mechanism for generating linear driving movements. A motor-free drive has in particular a gas pressure spring which has a drive unit with a gas-filled gas pressure spring cylinder and a gas pressure spring piston rod guided axially therein, i.e. a push rod with a piston on the end side. The gas filled into the cylinder is then pressurized and thereby provides the spring force. This drive unit can additionally also be assisted by a drive spring assembly with at least one drive spring, in particular a helical spring, for example a helical compression spring, which provides an additional spring force.

SUMMARY

The present disclosure is based on the problem of designing and developing a drive in such a manner that high operational reliability is ensured with a simultaneously simple design.

The present disclosure describes axially securing the spring assembly via a securing element on an associated drive unit component transmitting a driving force. The securing element projects radially into the imaginary extension of the spring material, i.e. the spring wire forming the spring windings, of the drive spring assembly, such as of the axially closest drive spring. The term "axially" refers here to the direction of the spring center line or geometrical drive axis. The imaginary extension, in the further "projection", of the spring material may extend annularly around the geometric drive axis. Firstly, this may provide a relatively simple installation since the respective securing element merely has to be screwed on. Secondly, the conventionally stably configured component of the drive unit will not, or not so rapidly, melt away in the event of a fire. If the securing element is then also configured to be fireproof, the joint part can melt away without a risk arising because of the spring assembly.

In detail, it is proposed that, in the mounted state, at least one of the components of the drive unit, such as both components of the drive unit, is or are coupled in an axially fixed manner to a securing element via a threaded connection, and that the securing element may project radially into an axial projection of a spring material of the drive spring assembly.

The provision of a threaded connection produces, in addition to the securing function, simple installation in combination with a stable connection which is provided in particular directly between the securing element and the component of the drive unit.

In one or more more embodiments, one component of the drive unit may be connected via the securing element to the associated joint part. This may result in relatively simple installation of the joint part and of the securing element on the component of the drive unit, such as when the two can be screwed on together.

In one or more embodiments, the securing element may be axially disposed between the spring material and a bearing portion.

As an example, the securing element, and therefore a component of the drive unit, is secured against rotation in relation to the joint part.

In another embodiment, an axial end of the hollow cylinder facing the associated joint part may include an axial extension that may be axially fixed with respect to the hollow cylinder and the securing element can be screwed to the axial extension. As an example, the axial extension may include an axial end portion provided with a reduced cross section. This may provide a plurality of functions. Firstly, as an insertion aid for the installation and, secondly, it can increase the torque which is required for loosening the threaded connection if it is in engagement with a corresponding receptacle of the associated joint part. In addition, it can be used to center the hollow cylinder with respect to the joint part.

In one or more embodiments, the hollow cylinder such as the axial extension and/or the rod may include external threads forming the threaded connection. The threaded connection can be secured against loosening. As an example, this is undertaken via a securing against rotation portion which can be formed by the axial end portion.

The drive may include a drive housing. For centering at least one of the components of the drive unit in the axial direction, one of the housing tubes can have a centering collar. As an example, in combination with an installation aid.

According to another embodiment, a method for installing a drive is claimed. This method may be used for installing a drive according to the proposal. Reference should be made to all of the statements regarding the drive according to the proposal.

In the case of this method, the connection of the inner housing tube to the associated joint part, to the drive unit and to the spring assembly, for which in particular the centering collar is provided as an installation aid, is an essential factor.

BRIEF DESCRIPTION OF THE DRAWINGS

The invention will be explained below in more detail with reference to a drawing which illustrates merely exemplary embodiments. In the drawing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known drive is described in DE 10 2008 061 117 A1 and includes a drive unit in the form of a gas pressure spring. The drive unit is radially surrounded by a drive spring assembly with a drive spring in the form of a helical compression spring. In order to conduct linear driving movements to the motor vehicle, the drive has two joint parts which are adjustable with respect to each other along a geometrical drive axis between a retracted position and an extended position and which, in each case with a mating joint part on the motor vehicle side, form a drive connection for coupling to the adjustment element at one end and to the motor vehicle furthermore at the other end. The one joint part is coupled in an axially fixed manner here to a hollow cylinder of the drive unit, namely the gas pressure spring cylinder, and the other joint part is coupled in an axially fixed manner to a rod of the drive unit, namely the rod which is provided with the gas pressure spring piston. A metal plate is in each case provided between the respective joint part and the drive unit, with the drive spring of the drive spring assembly being supported axially on said metal plate in order to transmit the spring force to the joint parts.

The drive housing, which is made from a plastic material, is angled inward at both axial ends and therefore forms a base which secures the respective metal plate toward the joint part counter to the spring force of the drive spring assembly. In the state mounted on the motor vehicle, the two joint parts themselves which are each coupled to the associated component of the gas pressure spring, i.e. the gas pressure spring cylinder on the one hand and the gas pressure spring piston rod on the other hand, form a further axial securing. However, it is problematic that, in the event of destruction of the housing and of the joint parts, for example in the event of a fire, there is the risk of an undesired expansion of the drive spring of the drive spring assembly since the two metal plates then may no longer have any axial support or at any rate sufficient axial support.

It is also known, to the axial supporting of a drive spring of a drive spring assembly, to provide metal bodies which are in each case crimped with the drive unit components transmitting the driving force, i.e. the hollow cylinder and the rod guided axially therein, in order to axially secure the metal bodies on the drive unit and thereby to prevent an undesired expansion of the drive spring. These metal bodies are then conventionally insert molded with plastic material in order to form the associated joint part. A corresponding drive is of relatively complex design and has a high number of parts.

The drive 1 which is illustrated in the drawing and is in the form here of a linear drive may be provided, in a manner yet to be explained, as a gas pressure spring drive. Basically, however, the drive 1 can also be configured as a spindle drive. The statements regarding a gas pressure spring drive therefore also apply equally to a spindle drive.

Figure 1:
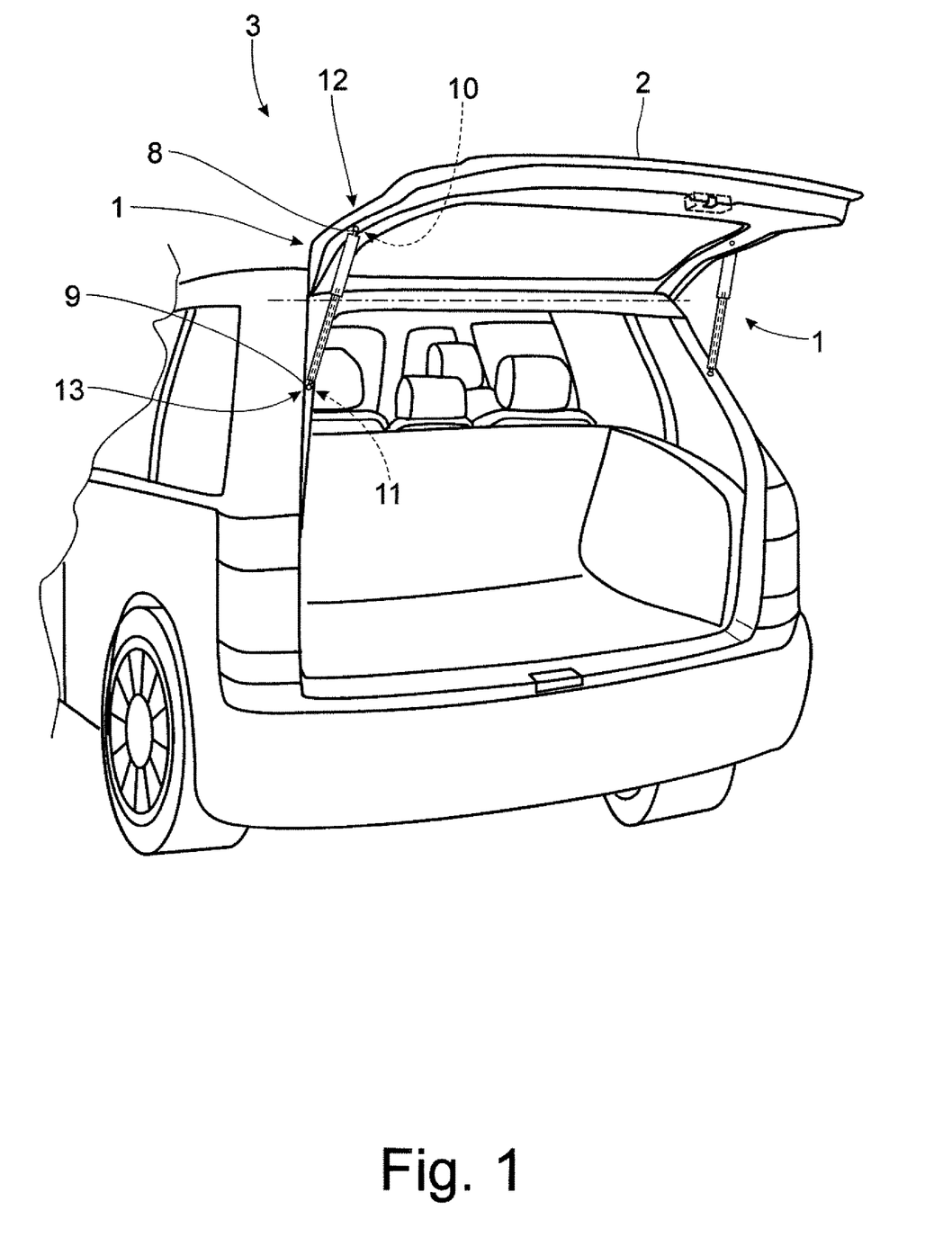
FIG. 1 shows a schematic perspective view of the rear of a motor vehicle with a drive according to the proposal.

The drive 1 according to the proposal, which is configured here as a gas pressure spring drive, is used for the, here motor-free and purely spring-driven, adjustment of an adjustment element 2, in particular a flap, of a motor vehicle 3. The adjustment element 2, according to FIG. 1, is a tailgate of the motor vehicle 3. With regard to other refinements of the adjustment element 2, reference should be made to the list in the introductory part of the description. As illustrated, it is also possible here to provide a plurality of drives 1, in particular two drives 1, for adjusting the adjustment element 2.

The drive 1 has a drive unit 4 which has a hollow cylinder 5 and a rod 6, guided axially therein, as components transmitting a driving force. The hollow cylinder 5 and the rod 6 are prestressed against each other, here, inter alia, via a gas filled into the hollow cylinder 5, here and preferably into the extended position.

In order to conduct linear driving movements to the motor vehicle 3, the drive 1 has two joint parts 8, 9 which are adjustable with respect to each other along the geometrical drive axis 7 between a retracted position and an extended position and here and preferably are structurally identical. The upper joint part 8 in FIGS. 2 and 3 together with a mating joint part 10 which is on the motor vehicle side and is arranged here on the adjustment element 2 forms a drive connection 12 for coupling to the adjustment element 2. The lower joint part 9 in FIGS. 2 and 3 forms together with a mating joint part 11 which is on the motor vehicle side and is arranged here on the motor vehicle body a drive connection 13 for furthermore coupling to the motor vehicle 3. As an example, the two joint parts 8, 9 each have a ball socket, the ball sockets being coupled in an articulated manner to a ball head of the respective mating joint part 10, 11. In another embodiment, it is also conceivable for the joint parts 8, 9 to have a ball head and for the mating joint part 10, 11 to have a ball socket.

Figure 2:
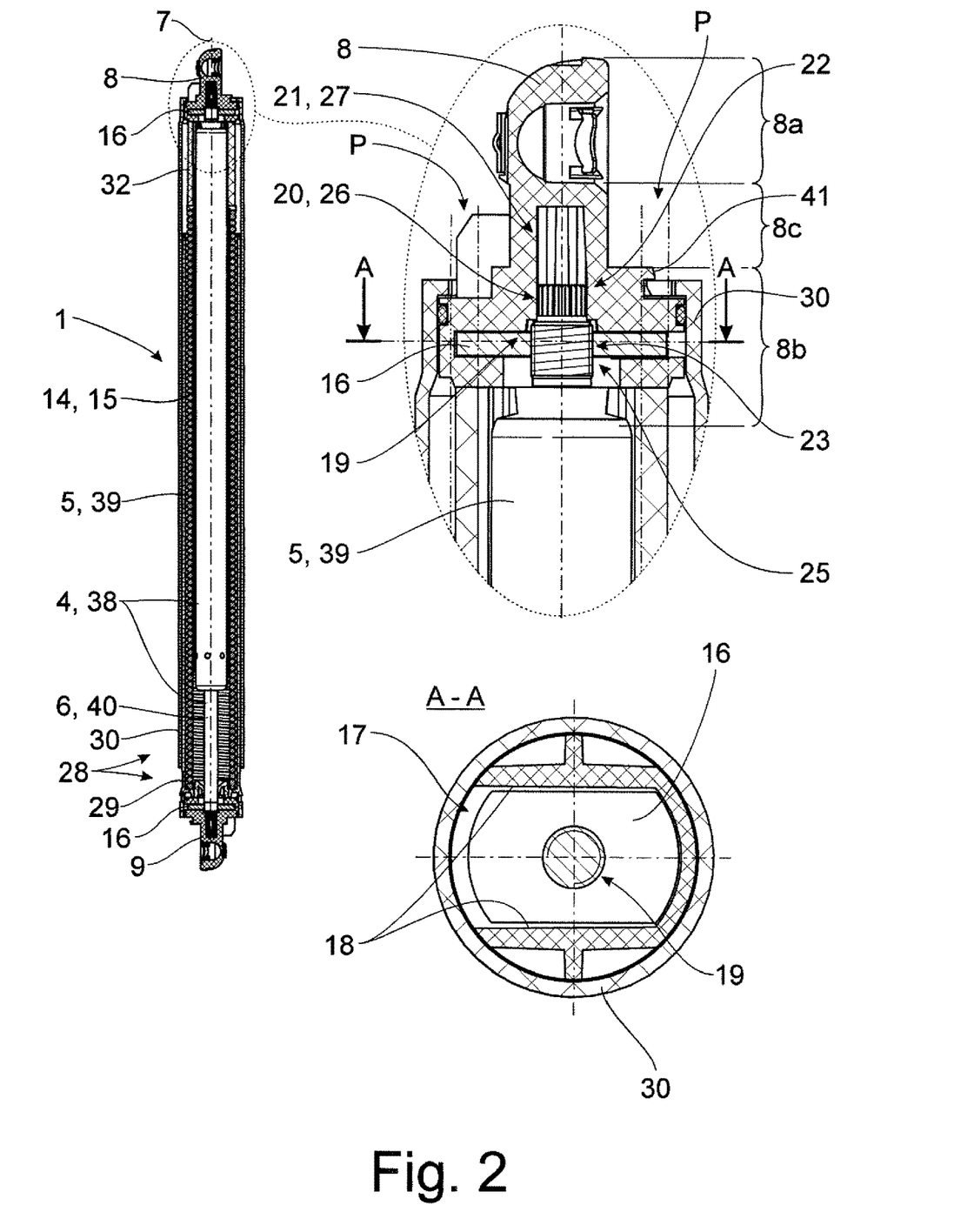
FIG. 2 shows a sectional view of the drive according to the proposal according to FIG. 1 in a retracted position.
Figure 3:
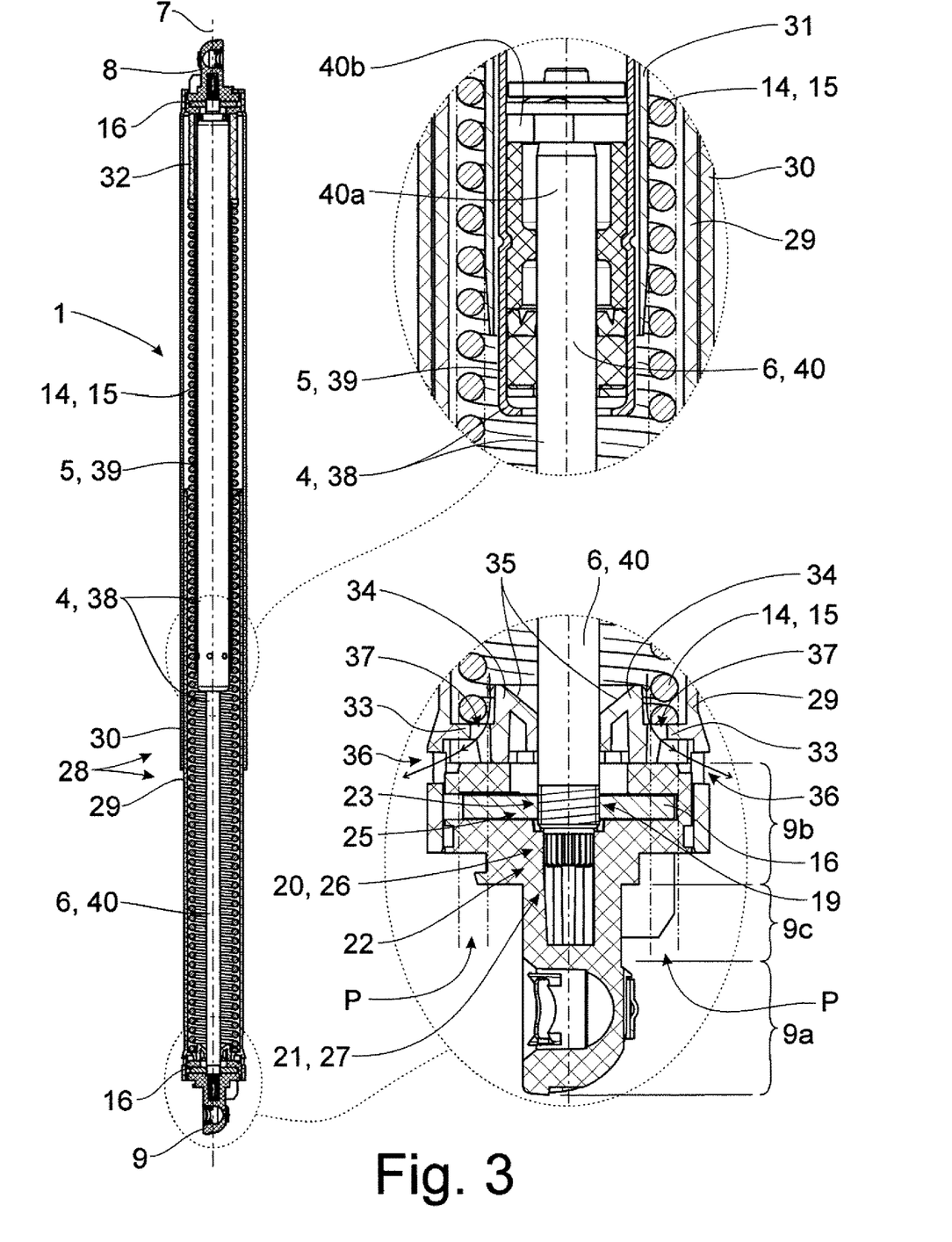
FIG. 3 shows a sectional illustration of the drive according to the proposal according to FIG. 1 in an extended position.

As the enlarged detailed views in FIGS. 2 and 3 show, the one joint part 8 is coupled in an axially fixed manner to an associated first of the components 5, 6 of the drive unit 4, here the hollow cylinder 5, and the other joint part 9 is coupled in an axially fixed manner to an associated second of the components 5, 6 of the drive unit 4, here the rod 6, in each case in the mounted state. The axially fixed coupling will also be explained in more detail below.

Furthermore, the drive 1 according to the proposal has a drive spring assembly 14 with at least one drive spring 15, such as one drive spring 15, which acts on the two joint parts 8, 9, i.e. is prestressed thereon. By means of the drive spring assembly 14 and the gas filled into the hollow cylinder 5, the joint parts 8, 9 are prestressed against each other, here into the extended position. The at least one drive spring 15, for example, one drive spring 15, may be a helical spring, and as an example, a helical compression spring. According to an embodiment, not illustrated here, it is also conceivable, in addition or alternatively to a helical compression spring, to provide a helical tension spring as part of the drive spring assembly 14.

As an example, in the mounted state, at least one of the components 5, 6 of the drive unit 4, such as both components 5, 6 of the drive unit 4, is or are coupled in an axially fixed manner to a securing element 16 via a threaded connection, and that the securing element 16 projects radially into an axial projection P of a spring material of the drive spring assembly 14.

When here and below the "mounted state" is mentioned, the assembled state of the drive is always meant. In this state, there is the axial form fit between the respective joint part 8, 9 and the associated component 5, 6 in both directions, that is to say along the geometrical drive axis 7 both in the direction of the retracted position and in the direction of the extended position.

While a securing element 16 is provided along the drive axis 7 on both sides so that, in the event of a fault, for example in the event of a fire, the drive spring assembly 14 and for example the drive spring 15 are secured against an abrupt relaxation, it also emerges from the further statements that an embodiment in which only one individual securing element 16 according to the proposal is provided is advantageous. This relates for example to the simple installation of the securing element 16 which may not be identical for the two joint parts 8, 9. Accordingly, the advantages for the installation can arise more on one side than on the other.

In order to use its securing function, the securing element 16 projects radially into the axial projection P of the spring material, such as the spring material of the drive spring 15. In the case of the helical spring, which is for example, a helical compression spring, the projection P is the projection of the spring windings at a certain radius from the drive axis 7. The term "spring material" therefore relates to that region of the drive spring assembly 14 in which material of a drive spring 15 is actually present (e.g., the spring windings).

As an example, in order to simplify the installation, but also in order to increase the compactness and the structural strength of the drive 1, provision can be made for one component 5, 6 of the drive unit 4, such as both components 5, 6 of the drive unit 4, to be connected via the securing element 16 to the respectively associated joint part 8, 9. It emerges from an overall view of FIGS. 2 and 3 that this is provided here for both components 5, 6 of the drive unit 4. This is shown by way of example in FIG. 4 for the hollow cylinder 5 and the upper joint part 8.

Figure 4:
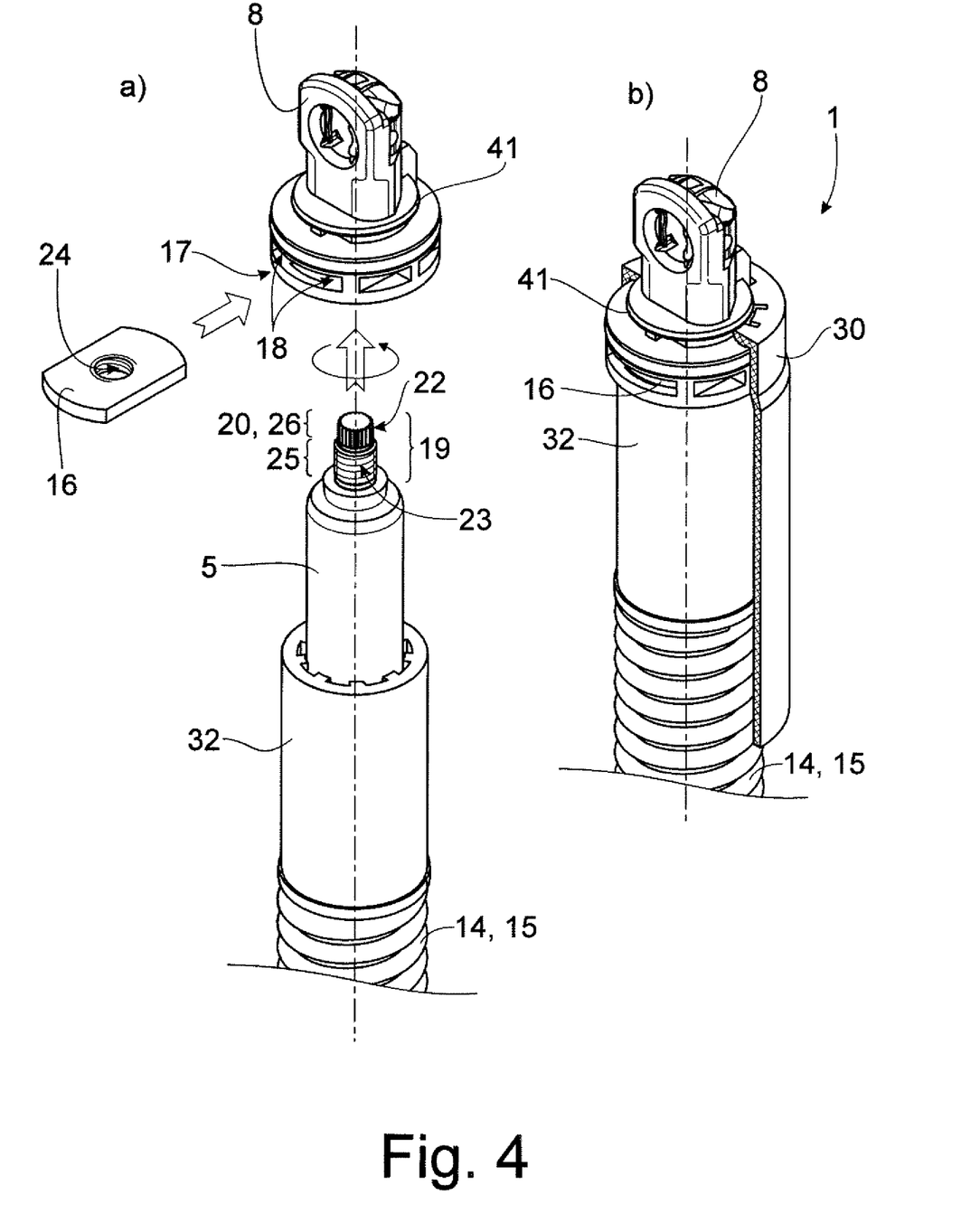
FIG. 4 shows an enlarged perspective view of a detail of the drive according to the proposal according to FIG. 1 in a schematic illustration of an installation sequence.

As illustrated in FIG. 4b), the securing element 16 may be accommodated in the joint part 8, 9. This and also the further statements which are made only with regard to one joint part 8, 9 can equally apply to the other joint part 8, 9.

As an example, the joint part 8, 9 forms a receptacle 17 into which the securing element 16 is introduced from the radial direction. The introduction operation is illustrated in FIG. 4a).

In principle, it is of advantage in the case of the drive 1 according to the proposal if the different components are centered as far as possible, and remain, along the drive axis 7. This relates not only to the installation, but also during operation of the drive 1 this centering can be important, for example in the event of icing, to avoid damage to parts which are less stable, for example plastic parts, if the icing breaks and some of the components of the drive 1 carry out a jerky movement. In addition, a well centered drive 1 makes it possible to use plastic parts which are more cost-effective since they are subjected to a more precise or lesser load. The threaded connection, for example, in combination with the receptacle 17 affords a contribution here to centering the component 5, 6 of the drive unit 4 with respect to the joint part 8, 9. Accordingly, the securing element 16 is configured here and for example, in such a manner that it centers the component 5, 6 with respect to the joint part 8, 9, such as by the threaded connection being aligned along the drive axis 7 and/or being coaxial with respect thereto.

The respective joint part 8, 9 may include a bearing portion 8a, 9a for coupling to the mating joint part 10, 11, such as a ball socket, and, spaced apart therefrom, an attachment portion 8b, 9b for coupling to the respectively associated component 5, 6 of the drive unit 4. The bearing portion 8a, 9a is connected to the attachment portion 8b, 9b via a connection portion 8c, 9c. As an example, bearing portion 8a, 9a and connection portion 8c, 9c, for example, also together with the attachment portion 8b, 9b, are configured as an integral component. As an example, the securing element 16 is accommodated in the attachment portion 8b, 9b. The latter may form the receptacle 17.

With regard to the arrangement of the securing element 16 along the geometrical drive axis 7, the securing element may be made for the securing element 16 to be arranged axially between the spring material and at least one portion 8a, 8b, 8c, 9a, 9b, 9c, such as the bearing portion 8a, 9a, of the respective joint part 8, 9. Provision can also be made here for the securing element 16 to be arranged between the overall joint part 8, 9 and the spring material.

As an example, the securing element 16 is coupled axially, in particular on both sides, to the respective joint part 8, 9 in a form-fitting manner. In one embodiment, the securing element 16 cannot be moved, or cannot substantially be moved, in the axial direction in relation to the respective joint part 8, 9. As an example, for this purpose, the securing element 16 may be in direct contact with the joint part 8, 9.

Provision can be made for the securing element 16, e.g., in interaction with the receptacle 17, to provide securing of the securing element 16 against rotation in relation to the joint part 8, 9, and therefore as an example of the component 5, 6 of the drive unit 4 in relation to the respectively associated joint part 8, 9.

Very generally, the securing element 16, as an example, is configured to be flat, e.g., disk-shaped, in the radial direction. In this case, the securing element 16 can have a substantially round radial outer contour. However, provision can also be made for the securing element 16 to have a radial outer contour which differs from a round shape. As an example, the securing element 16 can have a substantially oval or polygonal radial outer contour. It is made possible specifically as a result for the securing element 16 to be secured against rotation on a mating element 18 which may be connected non-rotatably to the respective joint part 8, 9 or is furthermore formed integrally with the respective joint part 8, 9. In the exemplary embodiment, the mating element 18 is the receptacle 17 or is formed by the walls of the receptacle 17.

As already indicated previously, as an example, the hollow cylinder 5, specifically at its axial end facing the associated joint part 8 or joint part coupled thereto, is provided with an axial extension 19 which is axially fixed with respect to the hollow cylinder 5.

The securing element 16, for example, in the mounted state, screwed onto the axial extension 19. As an example, provision is made for the rod 6 to also have an axial extension 19 which, however, unlike in the case of the hollow cylinder 5, does not have a diameter reduced in relation to the rod 6. All of the statements regarding the axial extension 19 of the hollow cylinder 5 can apply correspondingly to the axial extension 19 of the rod 6.

As an example, the axial extension 19 has an axial end portion 20 with a cross section which is reduced in relation to the inside diameter of the securing element 16. By means of the reduction in the cross section, such as the diameter, an insertion aid for simplifying bringing the securing element 16 and axial extension 19 together during the installation can be provided. A further function of the axial end portion 20 is also explained below.

The axial extension 19 such as the axial end portion 20 may be connected in an integrally bonded, form-fitting and/or force-fitting manner to the hollow cylinder 5 or to the rod 6, or are formed integrally with the hollow cylinder 5 or the rod 6.

As an example, the axial extension 19 and/or the axial end portion 20 are/is in, in particular force-fitting and/or integrally bonded, engagement with a corresponding receptacle 21 of the respectively associated joint part 8, 9. This receptacle 21 of the joint part 8, 9 can fulfil a dual function. Firstly, it can ensure radial centering of the component 5, 6 of the drive unit 4 in relation to the joint part 8, 9 and therefore at the same time of the securing element 16; secondly, provision can be made for the axial end portion 20 to have a surface contour 22 which, in interaction with the corresponding receptacle 21, provides securing against rotation, which also includes locking against rotation. As an example, the surface contour 22 may be grooved, for example, with a plurality of longitudinal grooves, and may be made from metal and to become embedded in the receptacle 21 of the joint part 8, 9, formed for example from plastic, during a rotational movement.

Owing to the fact that via the axial end portion 20 and the threaded connection to the securing element 16, two contact regions, which are spaced apart axially from each other, are provided between the component 5, 6 of the drive unit 4 and the respectively associated joint part 8, 9, securing against tilting of the drive unit 4 in relation to the joint part 8, 9 can also be provided.

As an example, the hollow cylinder 5, in particular the axial extension 19, and/or the rod 6 has an external thread 23. As an example, the securing element 16 has a corresponding internal thread 24. The external thread 23 then together with the internal thread 24 in the mounted state forms the threaded connection. As an example, on the axial extension 19, a threaded portion 25 which forms the external thread 23, as seen from the outside, adjoins the axial end portion 20.

The threaded connection is secured for example against loosening, with known measures being able to be used. As an example, the threaded portion 25 of the axial extension 19 can have a non-circular cross section and/or be formed non-cylindrically in order to increase the release torque.

Additionally or alternatively, the hollow cylinder 5, for example, the axial extension 19, and/or the rod 6 has a securing against rotation portion 26 which is in, in particular force-fitting and/or form-fitting, engagement with a corresponding receptacle 27 of the respectively associated joint part 8, 9. As an example, the securing against rotation portion 26 is arranged axially outside the threaded portion 25. As an example, the axial end portion 20 of the axial extension 19 forms the securing against rotation portion 26 and/or the receptacle 21 corresponding to the axial end portion 20 forms the receptacle 27.

In a further embodiment, the engagement of the internal thread 24 with the external thread 23 can be configured to be self-locking in the release direction.

Furthermore, as in particular FIGS. 2 and 3 show, the drive 1 has a drive housing 28 with two housing tubes 29, 30, here a housing inner tube 29 and a housing outer tube 30, which housing tubes run telescopically one into the other during an adjustment between the retracted position and the extended position. As an example, the two housing tubes 29, 30 are axially fixed with respect to one joint part of the respectively associated joint parts 8, 9. Here, the housing inner tube 29 is axially fixed with respect to the lower joint part 9 in FIGS. 2 and 3, and the housing outer tube 30 is axially fixed with respect to the upper joint part 8 in FIGS. 2 and 3.

The drive spring assembly 14, which is formed here by a single drive spring 15, but may also be formed by a plurality of drive springs 15, may be arranged radially between the drive unit 4 and the drive housing 28. In order to guide the at least one and here single drive spring 15, a spring guide tube 31 is arranged radially between the drive unit 4 and the drive spring assembly 14.

As shown in the figures, a spacer 32 on which the drive spring 15 is supported can additionally also be provided between the drive spring 15 and the respective joint part 8, 9.

The axially fixed connection between the inner housing tube 29 and the associated joint part 9 takes place for example by means of an axial form fit in such a manner that a housing flange 33 is fixed axially between an axial stop of the joint part 9 and the drive spring assembly 14. This can be provided in addition to the coupling via the securing element 16. Furthermore, provision can be made for the respective housing tube 29, 30 to extend axially in the mounted state beyond the respective securing element 16 and/or to radially surround the respective securing element 16. The securing element 16 is radially secured in this manner and is also not readily accessible from the outside. Since this radial securing may be unnecessary, this can also be used for purely visual aspects.

Provision can furthermore be made, as shown in the enlarged view at the bottom of FIG. 3, for at least one of the housing tubes 29, 30, in particular the inner housing tube 29, to have a centering collar 34 which runs radially within the housing tube 29, 30 in the axial direction along the respectively associated component 5, 6 of the drive unit 4, in particular the axial extension 19 or the rod 6, and as an example, as an installation aid, forms a receptacle 35, widening radially in the axial direction, for the respectively associated component 5, 6. In the case of the drive 1 according to the proposal, during the installation the inner housing tube 29 is pushed blindly over the rod 6. In order to simplify this, use is made of the centering collar 34. The latter guides the rod 6 through the slope of the receptacle 35.

Additionally or alternatively, the centering collar 34 can center the respective component 5, 6 with respect to the respectively associated joint part 8, 9. This firstly prevents tilting of the component 5, 6 in relation to the drive axis 7 and secondly simplifies the installation on the securing element 16 and/or on the joint part 8, 9.

As an example, the centering collar 34 is connected integrally to the housing tube 29, 30. As an example, the centering collar 34 is configured to provide a seal in the axial direction. Water management of the drive 1 can thereby be improved.

Since the drive 1 on the motor vehicle 3 can be in contact, for example, with rainwater, for the water management, for example, at least one drainage opening 36 is furthermore provided at least on one of the housing tubes 29, 30, such as on the lower housing tube 29, 30 in the state mounted on the motor vehicle 3. As an example, at least two drainage openings 36, or at least three drainage openings 36, or at least four drainage openings 36, are provided. The corresponding water flow is indicated in FIG. 3 by arrows.

The drainage opening 36 fluidically connects an interior space of the drive 1 to the surroundings. In particular, metal parts in the interior of the drive 1 are thereby protected against corrosion. The interior space of the drive 1 that is fluidically connected to the surroundings is preferably the interior space which accommodates the drive spring 15. As an example, the centering collar 34 has at least one drainage opening 37. The drainage opening 37 of the centering collar 34 is fluidically in contact here with the drainage opening 36 of the joint part 8, 9.

As an example, it is furthermore the case that the respective securing element 16 and/or the at least one drive spring 15 of the drive spring assembly 14 and/or the respective component 5, 6, i.e. the hollow cylinder 5 or the rod 6, and/or the axial extension 19 are/is in each case made from metal. Additionally or alternatively, provision is made here for the respective joint part 8, 9 and/or the respective housing tube 29, 30 to be made from a plastic material.

As has already been mentioned previously, as an example, the drive 1 is configured as a gas pressure spring drive. As an example, the drive unit 4 is therefore configured as a gas pressure spring 38, wherein the first component 5 is a gas-filled gas pressure spring cylinder 39 and the second component 6 is a gas pressure spring piston rod 40 guided axially therein. A gas pressure spring piston rod 40 here is a unit consisting of a push rod 40a and a piston 40b.

As has likewise already been indicated, the drive 1 according to the proposal is not restricted to the configuration as a gas pressure spring drive, but can also be configured as a spindle drive. In this case, the drive unit 4 is configured as a spindle drive unit, wherein the first component 5 is a spindle nut tube with a spindle nut fixed axially and rotationally fixed with respect thereto, and the second component 6 is a threaded spindle meshing with the spindle nut. Such a spindle/spindle nut mechanism is well known and does not require any explanation here. An optional drive motor of the drive unit 4 can then actuate the spindle/spindle nut mechanism in a conventional way.

According to a further teaching which obtains independent importance, a method for installing a drive 1 is proposed. The method serves in particular for installing a drive 1 according to the proposal. Reference should be made to all of the statements regarding the drive 1 according to the proposal.

An essential factor in the case of the method is that the inner housing tube 29 is connected to the associated joint part 9, to the drive unit 4 and to the spring assembly 14. For this purpose, here and preferably, the inner housing tube 29 is pushed over one of the components 5, 6 of the drive unit 4, in particular the rod 6, and the drive spring 15. In the process, the inner housing tube 29 is centered via the centering collar 34 with respect to the component 5, 6 of the drive unit 4.

The associated joint part 9 can be connected here to the inner housing tube 29 before or after said joint part is pushed on. As an example, it is screwed, after being pushed on, onto the rod 6 via the securing element 16. Provision can be made for the drive spring 15 to be compressed, such as externally, when the inner housing tube 29 is pushed on.

After the inner housing tube 29 is connected to the associated joint part 9, to the drive unit 4 and to the spring arrangement 14, for example, the securing element 16, as shown in FIG. 4a), is introduced into the other joint part 8. Subsequently, the joint part 8 is screwed via the securing element 16 to the associated component 6 of the drive unit 4, in particular to the axial extension 19, in order to form the threaded connection. As an example, the drive spring 15 is compressed in the meantime, as can be seen in FIG. 4a). The outer housing tube 30 can subsequently be pushed over the joint part 8 and latches on the latter. For the latching, the joint part 8 can have a collar 41. As an example, the joint parts 8, 9 are structurally identical in order to save production costs, the collar 41 can also be provided on the other joint part 9. As an example, the centering collar 34 and the water management associated therewith also obtain independent importance, not only within the scope of the method.

Figure 5:
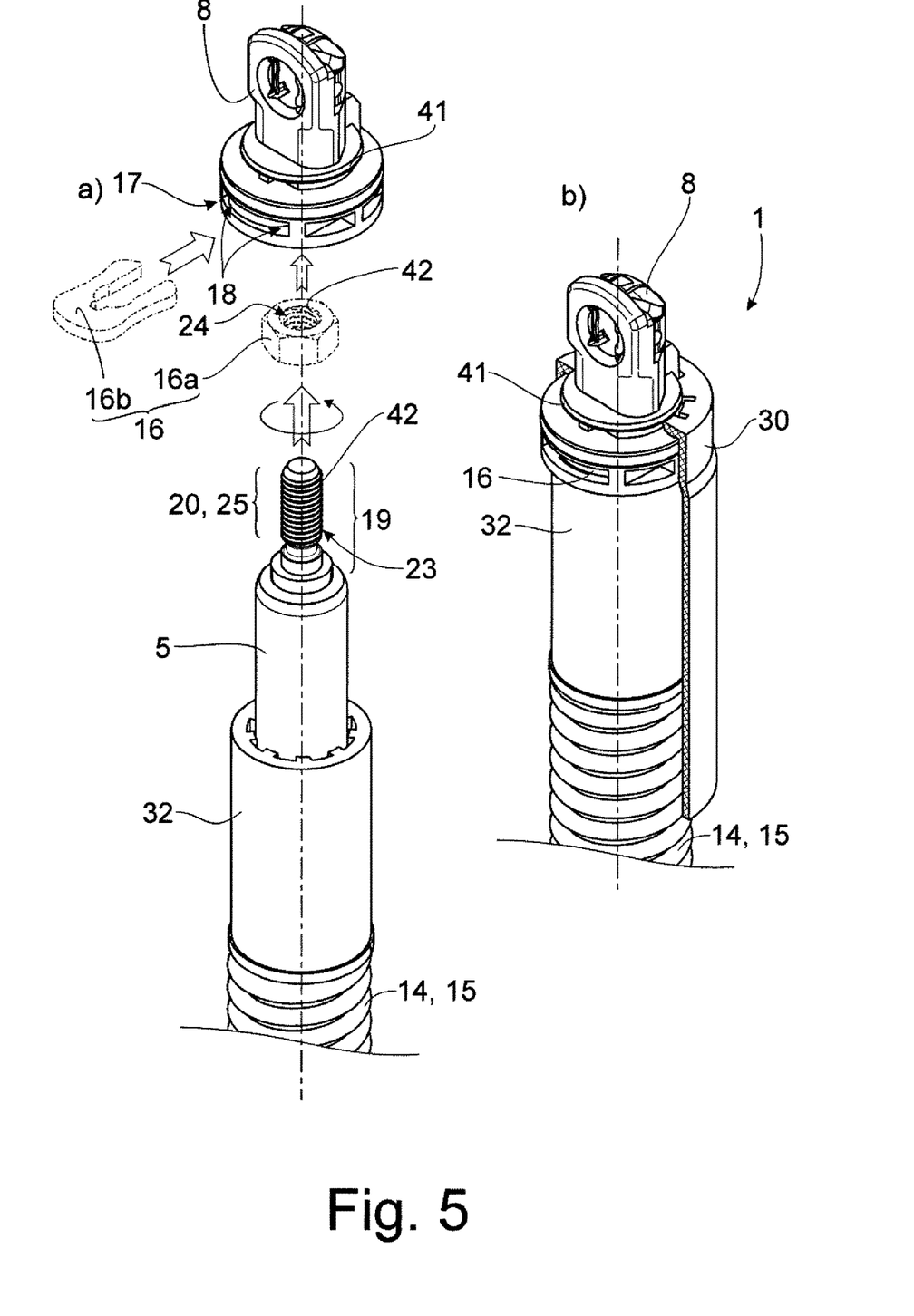
FIG. 5 shows an enlarged perspective view of a detail of an alternative embodiment of the drive according to the proposal according to FIG. 1 in a schematic illustration of an installation sequence.

FIG. 5 shows, corresponding to FIG. 4, an alternative embodiment of the previously described drive 1 according to the proposal during and after the installation. This drive 1 differs from the drive 1 shown in FIGS. 2 to 4 in that the securing element 16 here is not configured as a single part, but rather as multiple parts, such as two parts. The securing element 16 may be formed by a first securing element part 16a and a second securing element part 16b which together bring about the functions of the single-part securing element 16 of FIGS. 2 to 4, namely firstly the axially fixed coupling of the securing element 16 to the respective components 5, 6 of the drive unit 4 via a threaded connection (first function) and, secondly, that the securing element 16 projects radially into the axial projection P of the spring material of the drive spring assembly 14 (second function).

As an example, the first securing element part 16a is provided for the first function and the second securing element part 16b for the second function.

For this purpose, the first securing element part 16a may be configured as a screw nut with an internal thread 24 corresponding to the external thread 23. Radially on the outside, the first securing element part 16a is configured to be non-circular, in particular angular, here in the form of a hexagon, and the receptacle 21 which has already been described and which corresponds here to the first securing element part 16a, such as to its non-circular radial outer side, is provided in the respective joint part 8, 9.

Furthermore, as an example, the second securing element part 16b is configured as a form-fitting element which projects radially into the axial projection P of the spring material of the drive spring assembly 14. The second securing element part 16b here for example, a clip which is in the manner of a snap ring and which has two limbs between which, at any rate in the mounted and also here in the unmounted state, a gap is formed in which the axial extension 19 runs in the mounted state.

As shown in FIG. 5a), here too such as during the installation, in a manner corresponding to the procedure shown in FIG. 4a), the securing element 16 is first of all introduced into the associated joint part 8 and subsequently the joint part 8 is screwed via the securing element 16 to the associated component 6 of the drive unit 4, for example, to the axial extension 19, in order to form the threaded connection.

The introduction of the securing element 16 into the associated joint part 8 here comprises a plurality of installation steps, in particular two installation steps, namely firstly the axial insertion, such as secured against rotation, of the first securing element part 16a into the receptacle 21 and, secondly, for example, subsequently, the radial introduction of the second securing element part 16b into the receptacle 17. As an example, the second securing element part 16b projects, e.g., with its legs, radially into an axial projection of the material of the first securing element part 16*a* such that the first securing element part 16*a* is secured axially in the associated joint part 8.

The screwing of the joint part 8 to the associated component 6 of the drive unit 4, in particular to the axial extension 19, via the securing element 16 takes place here by screwing the first securing element part 16*a* to the external thread 23. The external thread 23 and/or the internal thread 24 can be provided here before installation with a microencapsulation 42 which, in the mounted state, prevents loosening or makes loosening difficult during operation. It is conceivable here for the microencapsulation 42 to have a microencapsulated adhesive which is activated during the screwing operation.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 drive
2 adjustment element
3 motor vehicle
4 drive unit
5 hollow cylinder
6 rod
7 drive axis
8 joint part
10 mating joint part
11 respective mating joint part
12 drive connection
14 drive spring assembly
15 drive spring
16 securing element
17 receptacle
18 mating element
19 axial extension
20 axial end portion
21 receptacle
22 surface contour
23 external thread
24 internal thread
25 portion
26 rotation portion
27 receptacle
28 drive housing
29 inner housing tube
30 outer housing tube
31 spring guide tube
32 spacer
33 housing flange
34 centering collar
35 receptacle
36 drainage opening
37 drainage opening
38 gas pressure spring
39 gas-filled gas pressure spring cylinder
40 gas pressure spring piston rod
41 collar
42 microencapsulation
8*a* bearing portion
8*b* attachment portion
8*c* connection portion
9*a* bearing portion
9*b* attachment portion
9*c* connection portion
16*a* first securing element part
16*b* second securing element part
40*a* push rod
40*b* piston While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A drive configured to adjust an adjustment element of a motor vehicle, the drive comprising:
a drive unit provided with a hollow cylinder and a rod collectively configured to transmit a driving force, the rod axially guided within the hollow cylinder;
two joint parts each configured to be adjusted with respect to each other along a geometrical drive axis between a retracted position and an extended position,
a first joint part of the two joint parts is disposed on a motor vehicle side of the drive and configured to be coupled with a first mating joint part to form a drive connection to couple the adjustment element at one end and to the motor vehicle,
a second joint part of the two joint parts disposed on an adjustment element end of the drive and configured to be coupled with a second mating joint part, the first joint part is axially fixed to one of the hollow cylinder and the rod of the drive unit, the second joint part axially fixed to the other of the hollow cylinder and the rod of the drive unit; and
a drive spring assembly including at least one drive spring configured to apply forces on the two joint parts,
wherein in a mounted state in which the drive is assembled, at least one of the hollow cylinder and the rod of the drive unit is axially fixed to a securing element by a threaded connection, the securing element projects radially into an axial projection of a spring material of the drive spring assembly,
wherein the securing element connects one of the hollow cylinder and the rod of the drive unit to the first joint part,
wherein the securing element is accommodated in the first joint part, and
wherein the first joint part defines a receptacle and the securing element is configured to be inserted into the first joint part from the radial direction.

2. The drive of claim 1, wherein the securing element is arranged axially between the spring material and at least one portion of one of the two joint parts.

3. The drive of claim 1, wherein the securing element is substantially flat, and/or in that the securing element includes a radial outer contour deviating from a round shape.

4. The drive of claim 1, wherein the hollow cylinder includes an axial end facing one of the two joint parts and an axial extension axially fixed with respect to the hollow cylinder, and in the mounted state, the securing element is screwed onto the axial extension.

5. The drive of claim 4, wherein at least one of the two joint parts defines a receptacle and the axial extension is configured to engage the receptacle.

6. The drive of claim 4, wherein at least one of the hollow cylinder and the axial extension includes an external thread, and the securing element includes an internal thread configured to engage the external thread to form a threaded connection when the drive is in the mounted state.

7. The drive of claim 1, further comprising:
a drive housing including an inner housing tube and an outer housing tube collectively configured to telescopically translate one into the other during an adjustment between a retracted position and an extended position.

8. The drive of claim 7, wherein the drive spring assembly is arranged radially between the drive unit and the drive housing.

9. The drive of claim 7, wherein at least one of the inner and outer housing tubes includes a centering collar extending radially within the one of the inner and outer housing tubes and axially along at least one of the hollow cylinder and the rod of the drive unit.

10. The drive of claim 1, wherein at least one of the inner and outer housing tubes defines at least one drainage opening fluidically connecting an internal space of the drive to an external space of the drive.

11. The drive of claim 4, wherein at least one of the securing element, the at least one drive spring, the rod, the hollow cylinder, and the axial extension is made from metal.

12. The drive of claim 1, wherein the drive unit is a gas pressure spring, the hollow cylinder is a gas-filled gas pressure spring cylinder and the rod is a gas pressure spring piston rod.

13. A method of installing the drive of claim 1, the method comprising:
connecting an inner housing tube of a drive housing, provided with the inner housing tube and an outer housing tube, to a second joint part of the two joint parts;
connecting the inner housing tube to the drive unit and to the spring assembly; and
centering the inner housing via a centering collar with respect to at least one of the hollow cylinder and the rod of the drive unit.

14. The method of claim 13, further comprising:
inserting the securing element into a first joint part of the two joint parts,
fastening the first joint part, via the securing element, to other of the hollow cylinder and the rod of the drive unit.

15. The drive of claim 4, wherein the axial extension includes an axial end portion having a cross section, the cross section is reduced in relation to an inside diameter of the securing element.

16. The drive of claim 7, wherein the inner and outer housing tubes are axially fixed with respect to one joint part of the two joint parts.

17. A drive configured to adjust an adjustment element of a motor vehicle, the drive comprising:
a drive unit provided with a hollow cylinder and a rod collectively configured to transmit a driving force, the rod axially guided within the hollow cylinder;
two joint parts each configured to be adjusted with respect to each other along a geometrical drive axis between a retracted position and an extended position,
a first joint part of the two joint parts is disposed on a motor vehicle side of the drive and configured to be coupled with a first mating joint part to form a drive connection to couple the adjustment element at one end and to the motor vehicle,
a second joint part of the two joint parts disposed on an adjustment element end of the drive and configured to be coupled with a second mating joint part, the first joint part is axially fixed to one of the hollow cylinder and the rod of the drive unit, the second joint part axially fixed to the other of the hollow cylinder and the rod of the drive unit; and
a drive spring assembly including at least one drive spring configured to apply forces on the two joint parts,
wherein in a mounted state in which the drive is assembled, at least one of the hollow cylinder and the rod of the drive unit is axially fixed to a securing element by a threaded connection, the securing element projects radially into an axial projection of a spring material of the drive spring assembly,
wherein at least one of the hollow cylinder and the rod includes a securing against rotation portion so that the threaded connection is secured against loosening.

18. The drive of claim 1, wherein the securing element includes a first securing element part and a second securing element part, wherein the second securing element part is configured to be inserted into the first joint part from the radial direction.

* * * * *